United States Patent [19]

Tagashira et al.

[11] Patent Number: 5,573,612

[45] Date of Patent: * Nov. 12, 1996

[54] TIRE AND RIM COMBINATION WITH EXHAUST MEANS IN TIRE BEAD

[75] Inventors: Kenji Tagashira; Yoshiaki Uemura, both of Kobe; Masanao Yoshida, Akashi, all of Japan

[73] Assignee: Sumitomo Rubber Industries, Ltd., Hyogo-ken, Japan

[ * ] Notice: The term of this patent shall not extend beyond the expiration date of Pat. No. 5,318,089.

[21] Appl. No.: 507,936

[22] Filed: Jul. 27, 1995

Related U.S. Application Data

[60] Continuation of Ser. No. 203,590, Mar. 1, 1994, abandoned, which is a division of Ser. No. 923,621, Aug. 3, 1992, Pat. No. 5,318,089.

[30] Foreign Application Priority Data

Aug. 9, 1991 [JP] Japan ..................... 3-224730
Jun. 16, 1992 [JP] Japan ..................... 4-183250

[51] Int. Cl.⁶ .................... B60C 15/02; B60C 15/024
[52] U.S. Cl. ..................... 152/544; 152/539; 152/543; 152/DIG. 9
[58] Field of Search ....................... 152/544, 539, 152/543, DIG. 9

[56] References Cited

U.S. PATENT DOCUMENTS

| | | | |
|---|---|---|---|
| 1,915,963 | 6/1933 | Wait | 152/544 |
| 2,587,470 | 2/1952 | Herzegh | 152/544 |
| 2,698,042 | 12/1954 | Perkins | 152/544 |
| 4,353,403 | 10/1982 | Ruip | 152/544 |
| 5,318,089 | 6/1994 | Tagashira et al. | 152/544 |

FOREIGN PATENT DOCUMENTS

| | | |
|---|---|---|
| 522447 | 9/1953 | Belgium . |
| 1153791 | 3/1958 | France . |
| 2409163 | 6/1979 | France . |
| 25360117 | 5/1984 | France . |
| 0938767 | 2/1956 | Germany . |
| 0114102 | 10/1978 | Japan . |
| 0151406 | 9/1982 | Japan . |
| 58-057321 | 12/1983 | Japan . |
| 295878 | 1/1954 | Switzerland . |
| 0768980 | 2/1957 | United Kingdom . |
| 0814403 | 6/1959 | United Kingdom . |
| 2011324 | 7/1979 | United Kingdom . |
| 2026957 | 2/1980 | United Kingdom . |

*Primary Examiner*—Adrienne C. Johnstone
*Attorney, Agent, or Firm*—Birch, Stewart, Kolasch & Birch, LLP

[57] ABSTRACT

A pneumatic tire to be mounted on a normal rim, has a pair of bead parts each having a bead bottom surface seating on a rim seat of the normal rim and bead outside surface connecting with the bead bottom surface and abutting against a rim flange of the normal rim. The bead outside surface is provided with an exhaust extending outward in the radial direction from an inner end of the exhaust so as to form the air passage for escape of air between the rim flange and bead outside surface at the time of rim assembly. The inner end of the exhaust is positioned within a region remote from a bead base line by a distance of 0.5 to 1.5 times a separating point height Fh defined as a height in the radial direction from the bead base line to a separating point at which the bead outside surface separates from the rim flange.

20 Claims, 10 Drawing Sheets

TIRE AND RIM COMBINATION WITH EXHAUST MEANS IN TIRE BEAD

This application is a continuation of application Ser. No. 08/203,590 filed on Mar. 1, 1994, now abandoned, which was a divisional application of Ser. No. 07/923,621 filed on Aug. 3, 1992, now U.S. Pat. No. 5,318,089.

The invention relates to a pneumatic tire capable of maintaining stable ride when using the tire by inhibiting formation of gaps between the outer surface of the bead part and the rim flange so as to prevent rim deviation, without leaking high pressure air in the tire inner space.

BACKGROUND OF THE INVENTION

In a pneumatic tire, for example, in a tire used for a passenger car, as the vehicle speed becomes higher, the frequency of abrupt starting and abrupt stopping becomes high. As a result, a strong fitting force between bead parts and the rim is required. On the other hand, the use of tubeless tires is increasing for high speed running, and in such tubeless tires, it is mounted on a rim with a particularly strong fitting force. In a tire for a bus or truck exposed to a heavy load, as the load increases, it comes to be fitted to the rim with a stronger fitting force.

Figure 14:
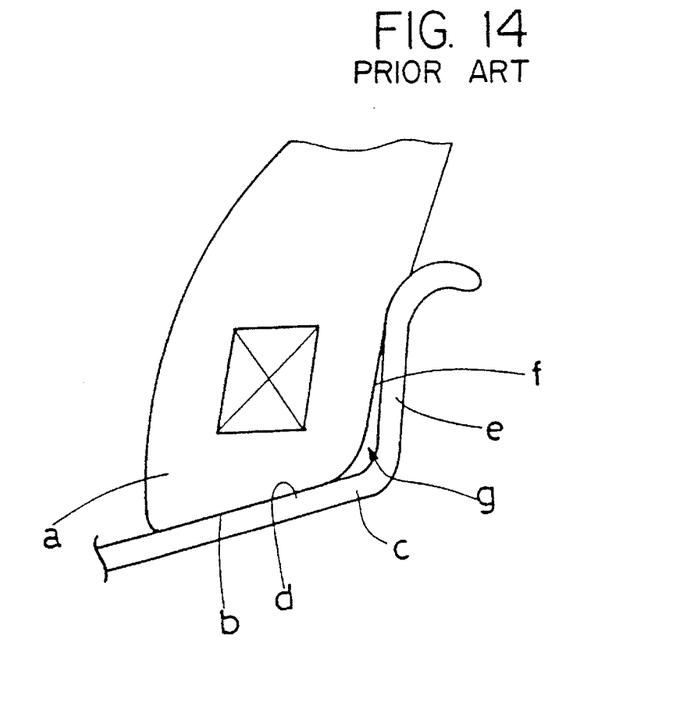
FIG. 14 is a sectional view showing a prior art design.

When assembling such a tire to the rim (c), as shown in FIG. 14, the bead bottom surface (b) of the bead part (a) is firmly fitted to the rim seat part (d) without causing a gap. But the bead outside surface (f) guided by the rim flange (e) starts contacting the upper end of the flange (e) when being assembled into the rim (c), so that a gap (g) is formed between the lower side of the outer side surface (f) and the flange (e).

This gap (g) decreases gradually as the tire runs to be fitted with the outer side surface (f). But along with the decrease of the gap (g), the rim assembly precision varies, and the fitting state of the tire and rim is changed. That is, the balance of the rim assembly state and the distribution state of the force variation are changed. This can lead to imbalance or impairment of force variation. Furthermore, the contact area of the bead part and rim decreases, and a rim deviation occurs between the bead part and rim seat when sudden braking occurs which disturbs the straightforward motion and lowers the durability of the tire.

In the tire assembled in the rim, meanwhile, although the force variation is checked before shipping, there is a difference in the assembly precision between the rim assembled in the shop and the rim assembled by the user. Therefore, in order to prevent formation of force variation, there has been a keen demand for the development of a tire with such a gap even if the tire is assembled in the rim without any particular attention by the user.

As a result of repeated studies and experiments to satisfy the above demand, the present inventors reached the following conclusions.

Formation of a gap between the bead outside surface and rim flange may be inhibited at the time of rim assembling by:

(1) Installing exhaust means capable of communicating between the gap and outside when assembling in the rim;

(2) Installing this exhaust means by providing grooves protrusions on the bead outside surface; and (3) Setting the inner end of the exhaust means at a position remote from the bead bottom surface in a specific distance in the radial direction.

Incidentally, formation of protrusions or grooves on the bead outside surface had been shown in the Japanese Patent Publication No. 58-57321, but this proposal is intended to prevent swelling of the tire when the tubeless tire is mounted on a wheel having a rim diameter smaller than the design value. In the above proposal, in order to achieve this object, the inner end of the grooves or protrusions is extended nearly up to the bead bottom surface. When the composition of this proposal is applied as the constitution of this application intended to eliminate the gap caused when assembling on the rim, even the air accumulated in the tire inner space may be forced out. Accordingly, it was found to be necessary to keep the inner end position of the exhaust means at a distance from the bead bottom surface.

SUMMARY OF THE INVENTION

It is hence a primary object of the invention to present a pneumatic tire capable of maintaining running stability by inhibiting formation of a gap between the bead outside surface and the rim flange so as to prevent rim deviation, without allowing escape of the high pressure air accumulated in the tire inner space when assembling the tire into the rim.

According to one aspect of the present invention, a pneumatic tire to be mounted on a normal rim, comprising a pair of bead parts each having a bead bottom surface seating on a rim seat of the normal rim and bead outside surface connecting with the bead bottom surface and abutting against a rim flange of the normal rim. A bead inside surface is opposed to the bead outside surface and adjacent the bead bottom surface. The rim seat extends to a rim protrusion on an axially inner side thereof. The bead outside surface has exhaust means extending outward in the radial direction from an inner end of the exhaust means so as to form the air passage for releasing the air between the rim flange and bead outside surface at the time of rim assembly. The inner end of the exhaust means is positioned within a region remote from a bead base line by a distance of 0.5 to 1.5 times a separating point height Fh defined as a height in the radial direction from the bead base line to a separating point at which the bead outside surface separates from the rim flange. The tire between the bead inside surface and the bead bottom surface is spaced from and out of engagement with the rim protrusion when the tire is mounted on the rim.

Here, the bead base line refers to the reference of the nominal diameter NRD of the rim, and means the tire axial line passing through the bead heel point at which the rim seat intersects the rim flange.

The exhaust means may also be grooves opened on the bead outside surface, or protrusions projecting from the bead outside surface.

When the bead outside surface is brought closer to the rim flange at the time of the rim assembly, the air existing between the bead outside surface and rim flange is exhausted through the air passage, because of the exhaust means of the specified composition installed at the bead outside surface. As a result, the air is not left over in the gap formed along the bead outside surface near the bead bottom surface as shown in FIG. 14.

Therefore, the nonuniformity of the rim assembly precision in the circumferential direction likely to occur conventionally as the gap decreases with the passing of the time in tire running will decrease. Force variation due to tire RRO and imbalance due to lowering of rim assembly precision will not increase. As a result, even in the case of long-term running, vibrations do not increase, and the running stability and comfort of riding are maintained. Also, uniform fitting and contact of the tire bead part and rim are retained, and therefore rim deviation in sudden braking is prevented while durability is enhanced. In addition, it is not necessary to pay special attention to rim assembling procedure, and the working efficiency is not lowered.

The exhaust means extends outward in the radial direction from the inner end located within a region remote from the bead base line outward in the radial direction by a distance of 0.5 to 1.5 times the separating point height Fh which is the distance between the bead base line and the separating point in the radial direction.

Figure 15:
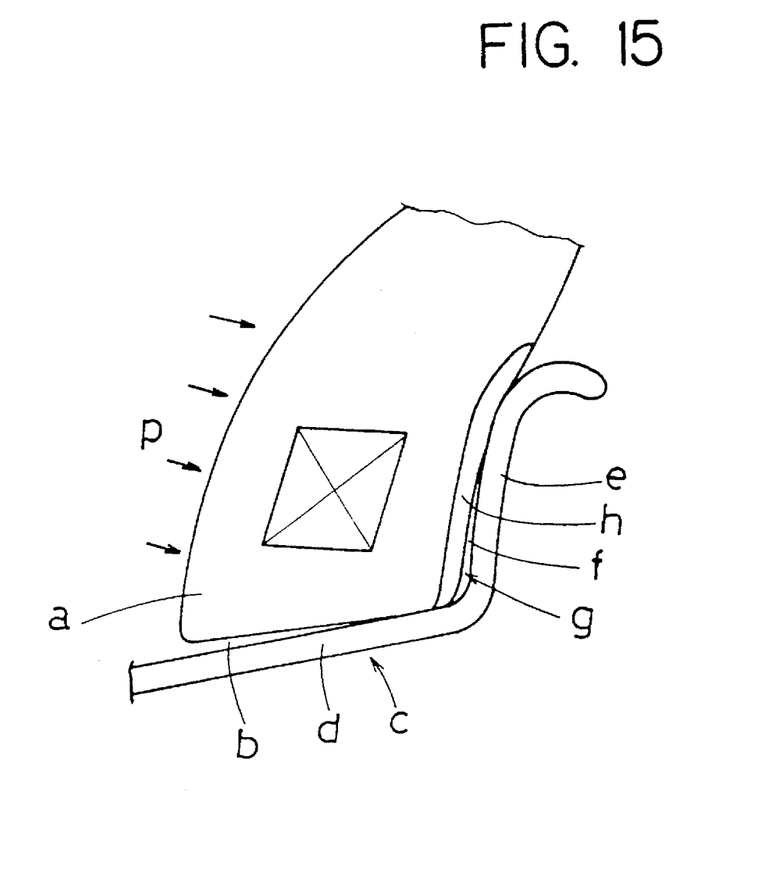
FIG. 15 is a sectional view showing a rim assembly of a conventional tire.

When assembling in the rim, as shown in FIG. 15, by heightening the pressure (p) in the tire inner space, the bead outside surface (f) is brought closer to the rim flange (e), and the air in the gap (g) formed between the outside surface (f) and rim flange (e) is forced out through the exhaust means (h). However, when the inner end of the exhaust means is brought closer to the bead bottom (b), if the fitting is imperfect between the bead bottom surface (b) and the rim seat (d) of the rim (c), for example, upon start of rim assembling work, the air in the inner space may escape through the exhaust means.

On the other hand, as a result of observation by CT scanner, the gap (g) formed at the time of rim assembly is known to be likely to be left over in a region close to the bead bottom surface (b). In order to remove the gap (g) completely, it is necessary to contact tightly the lower part of the bead outside surface (f) to the rim. Because of the above mentioned reasons, the inner end of the exhaust means is defined at 0.5 times the separating point height Fh. Meanwhile, the position of the inner end of the exhaust means is desired to be located outward in the radial direction as far as possible.

Figure 8:
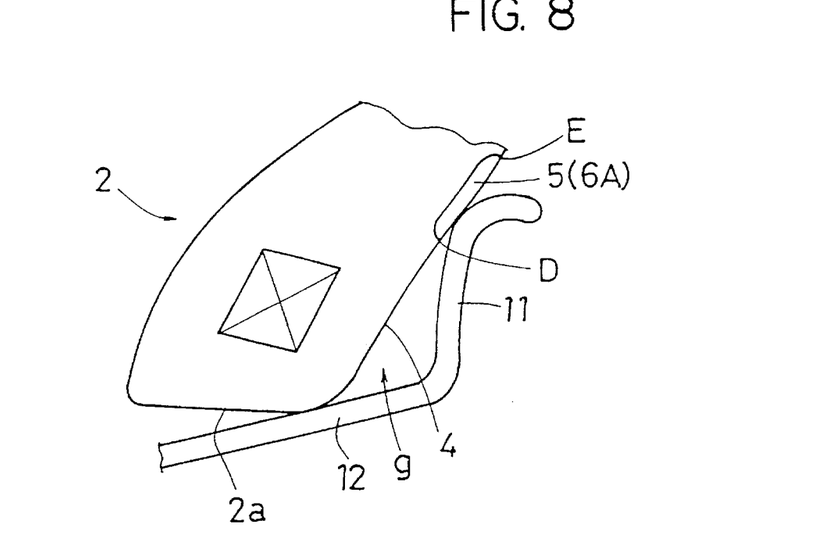
FIG. 8 is a sectional view showing an intermediate action of the rim assembly shown in FIG. 7.
Figure 9:
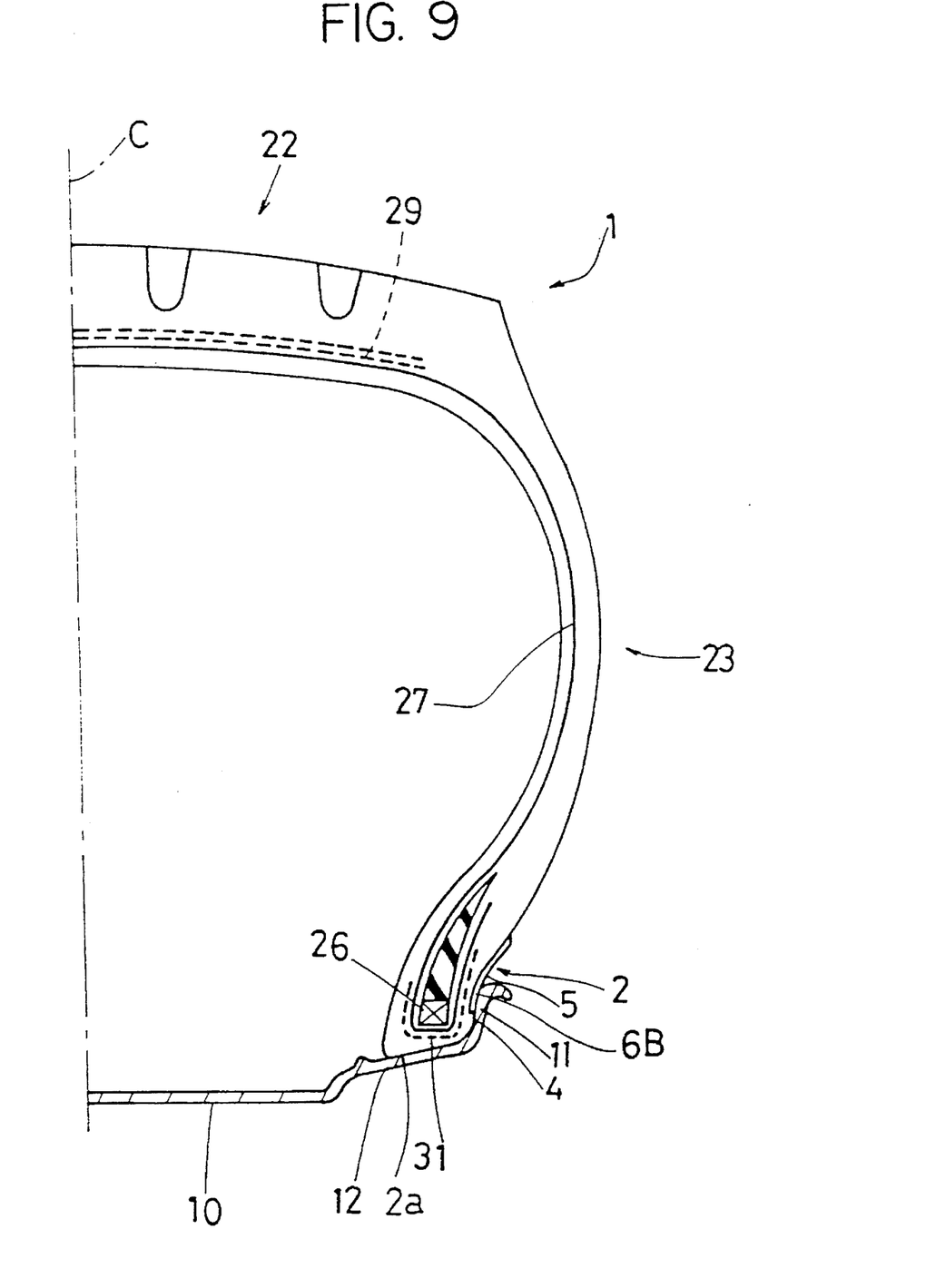
FIG. 9 is a sectional view of a right half of a tire in other embodiment.
Figure 10:
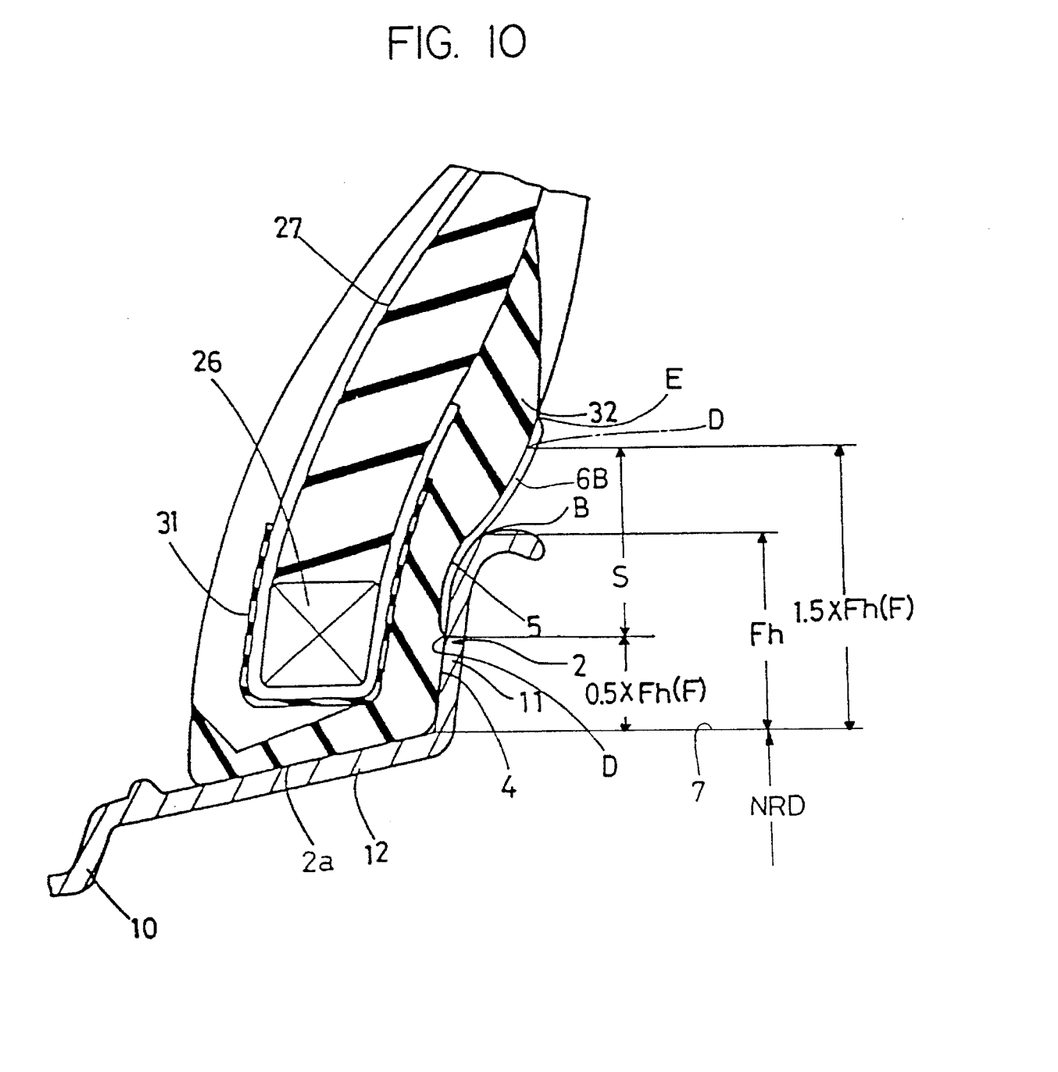
FIG. 10 is a sectional view magnifying the bead part of FIG. 9.

It is, incidentally, because of the following reason that the position of the inner end of the exhaust means may be installed by exceeding 1.0 times the separating point height Fh. In rim assembling, the bead bottom surface and rim seat are adhered with a strong fitting force. Accordingly, when starting the rim assembly, as shown in FIG. 8, the lower part of the bead part is inserted into the rim in a state of being inclined inward in the tire axial direction. Therefore, the bead outside surface contacts the rim flange at an upper position above the separating point height Fh, so that the inner end of the exhaust means may be located outward behind the separating point height Fh. However, if the inner end position of the exhaust means is over 1.5 times the separating point height Fh, even upon start of rim assembly, the inner end of the exhaust means does not communicate with the gap, and the air in the gap may not be forced out.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

An embodiment of the present invention will now be described by way of example, referring the attached drawings which are given by way of illustration only, and thus are not limitative of the present invention, and in which;

FIG. 12 is a sectional view showing a bead outside surface and rim flange in a rim assembly;

DETAILED DESCRIPTION OF THE INVENTION

FIGS. 1 to 8 show a pneumatic tire 1 which is mounted on a normal rim 10 and inflated with a normal internal pressure. In this embodiment, the pneumatic tire 1 is formed as a tubeless tire, and grooves 6A as exhaust means 6 extending in the tire radial direction are disposed on a bead outside surface 4 confronting a rim flange 11.

Figure 1:
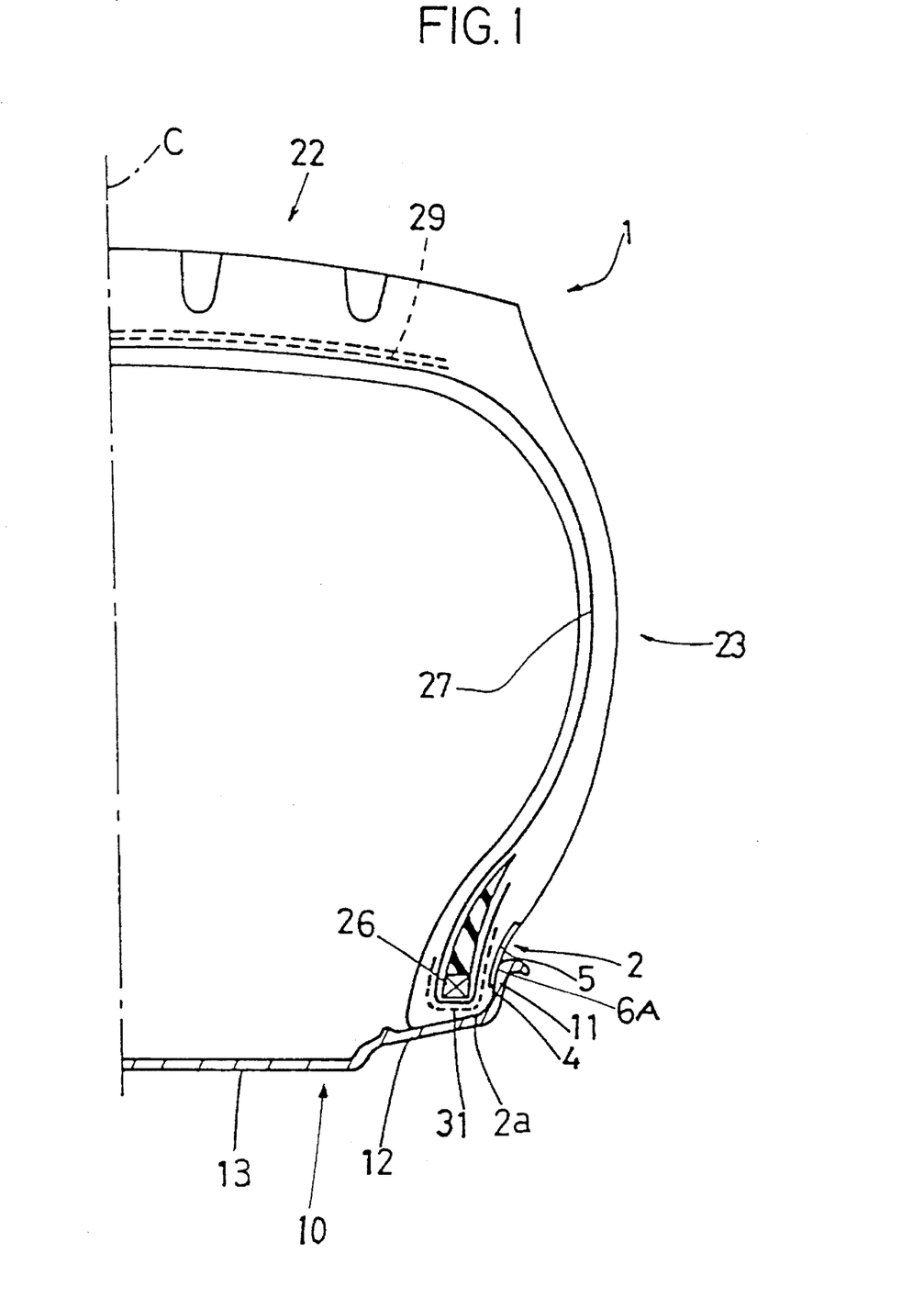
FIG. 1 is a sectional view of a right half of a tire showing an embodiment of the invention.
Figure 2:
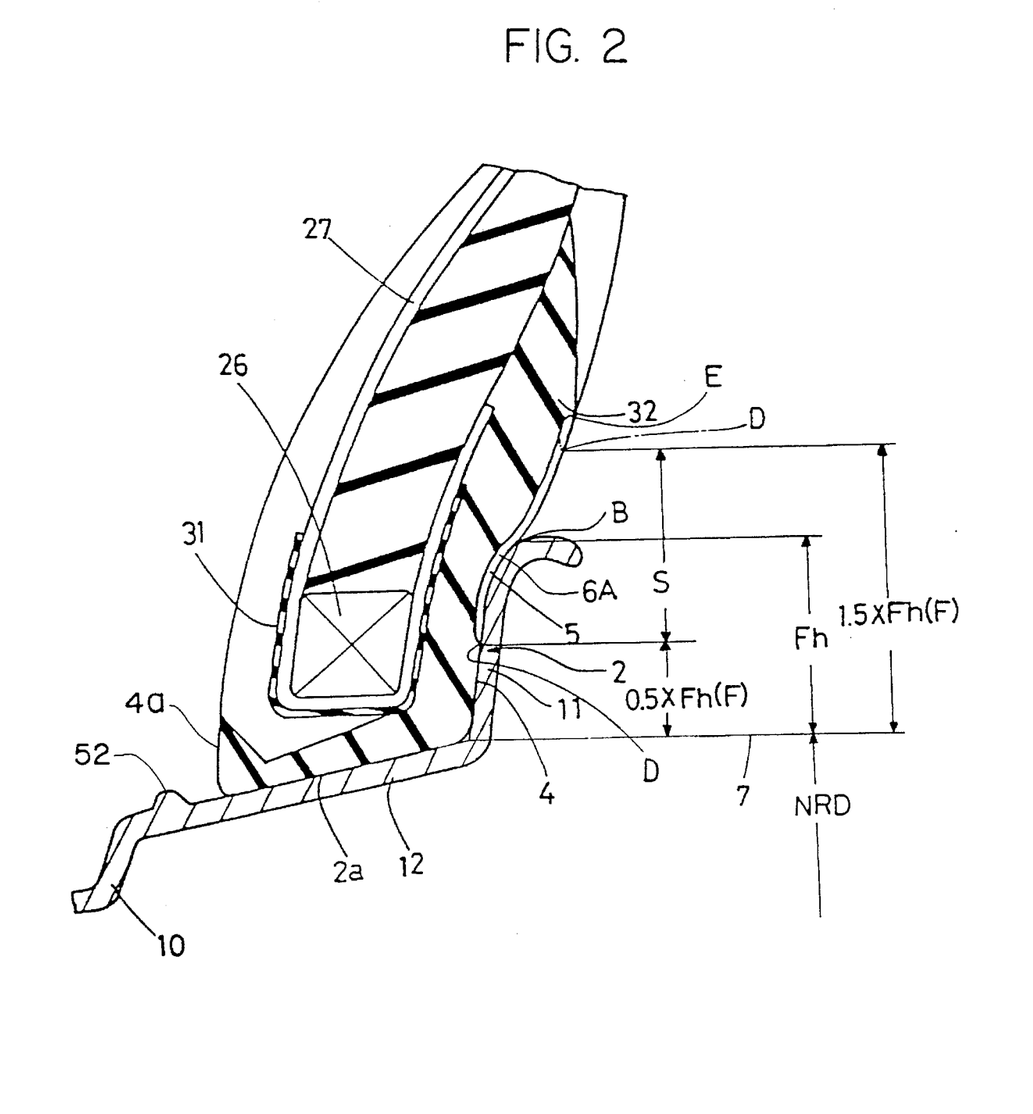
FIG. 2 is a sectional view magnifying the bead part.

The normal rim 10 has a pair of rim flanges 11 each receiving a bead outside surface 4 of a tire 1, a pair of rim seats 12 each extending inwardly from the rim flange 11 and receiving the bead bottom surface 2a of a tire 1, and a well region 13 between the rim seats 12. The rim flange 11 and rim seat 12 are smoothly connected to each other through a curvature heel region. Therefore, a bead heel point is defined as a intersection of a extension line of the rim flange 11 and extension line of the rim seat 12. A bead base line is defined as a tire axial line passing through the bead heel point.

The pneumatic tire 1 comprises a tread part 22, side wall parts 23, 23 each extending radially inwardly from both ends of the tread part 22, and bead parts 2, 2 each positioned in a radially inside end of the side wall part 23. Also, the pneumatic tire has a toroidal carcass 27 extending from the tread part 22 through sidewall parts 23 and turned up around a bead core 26 and each of two bead parts 2. A belt layer 29 is disposed radially outside the carcass 27.

The carcass 27 has a so-called radial or semiradial structure In which carcass cords are inclined at an angle of 60 to 90 degrees, in this embodiment, with respect to the tire equator C. The carcass cords are made of fiber cords such as nylon, polyester, rayon and aromatic polyamide.

The belt layer 29 is composed of at least two belt plies of belt cords crossing each other between the adjacent belt plies. The belt cords can be made of the same material as the carcass 27 such as, fiber cords like nylon, polyester, rayon and aromatic polyamide, or steel cords.

In this embodiment, a reinforcing layer 31 enveloping the carcass 27 around the bead core 26 is provided at the bead part 2. The reinforcing layer 31 is composed of a ply having organic fiber cords of enough strength such as aromatic polyamide cords or steel cords arranged so as to cross the carcass cords. The rigidity of the bead part 2 is enhanced by this reinforcing layer 31.

In the bead part 2, moreover, a chafer 32 capable of forming the bead bottom surface 2a and bead outside surface 4 is disposed outside the reinforcing layer 31. The hardness of the rubber of the chafer 32 in this embodiment is higher than that of the other rubber of the tire bead part 2, and the hardness is set to be larger than 65 degrees of JIS A hardness. A bead inside surface 4a is provided opposite to the bead outside surface 4 and adjacent the bead bottom surface 2a. Rim seat 12 extends to rim protrusion 52. The tire between the bead inside surface 4a and the bead bottom surface 2a is spaced from and out of engagement with the rim protrusion 52 when the tire is mounted on the rim as seen, for example, in FIG. 2.

When assembling the pneumatic tire 1 in the rim 10, the bead bottom surface 2a is seated on the rim seat 12 of the normal rim 10, and the bead outside surface 4 abuts against the rim flange 11.

The rim flange 11, as shown in FIG. 2, has a upper end portion which is curved outside in the axial direction so as to go apart gradually from the bead outside surface 4. Herein, a separating point height Fh is defined as a distance in the tire radial direction from the bead base line 7 to the separating point B at which the bead outside surface 4 separates from the rim flange 11 when the tire 1 is correctly mounted on the normal rim 10.

On the bead outside surface 4, as mentioned above, there are grooves 6A. Each of the grooves 6A extends outward in the radial direction from an inner end D positioned within a region S. The region S is defined as a region remote from the bead base line 7 by a distance F of 0.5 to 1.5 times the separating point height Fh. That is, the height of the inner end D from the bead base line 7 in the radial direction is set in a range from 0.5 to 1.5 times the separating point height Fh.

Figure 3:
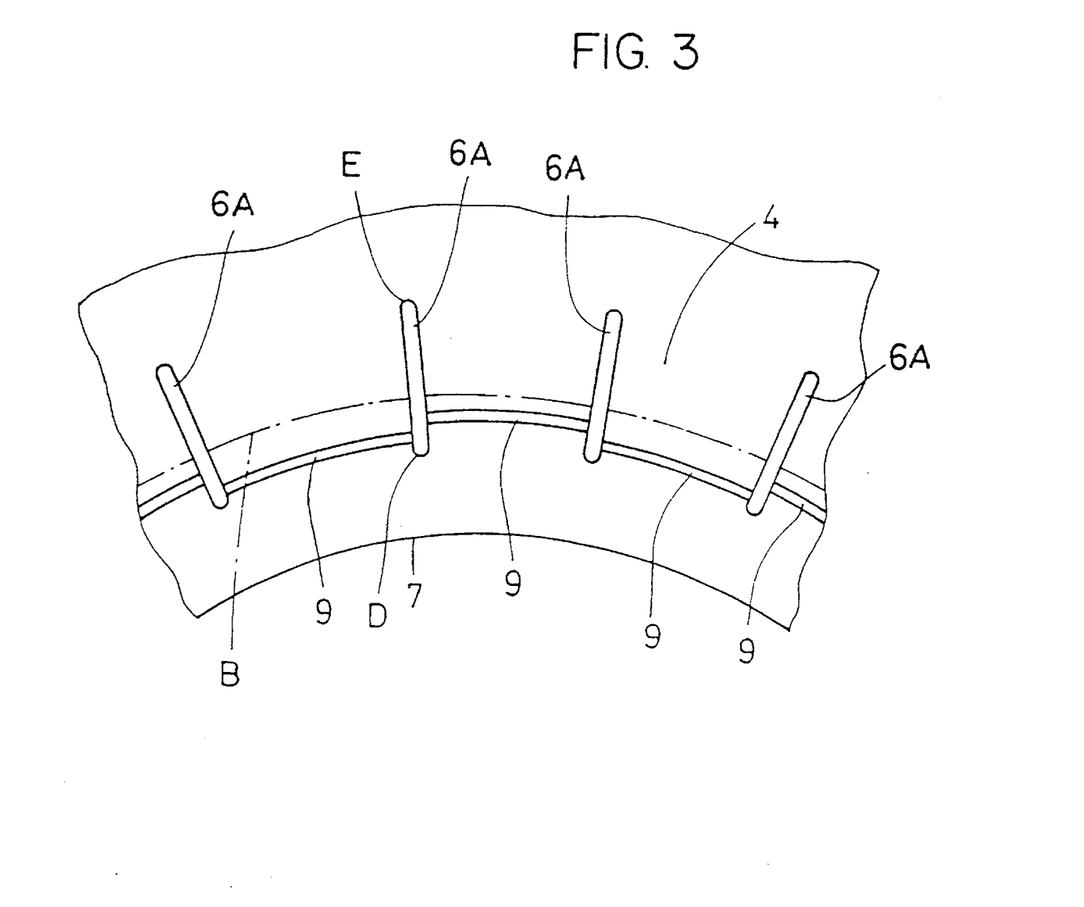
FIG. 3 is a front view showing grooves.
Figure 4:
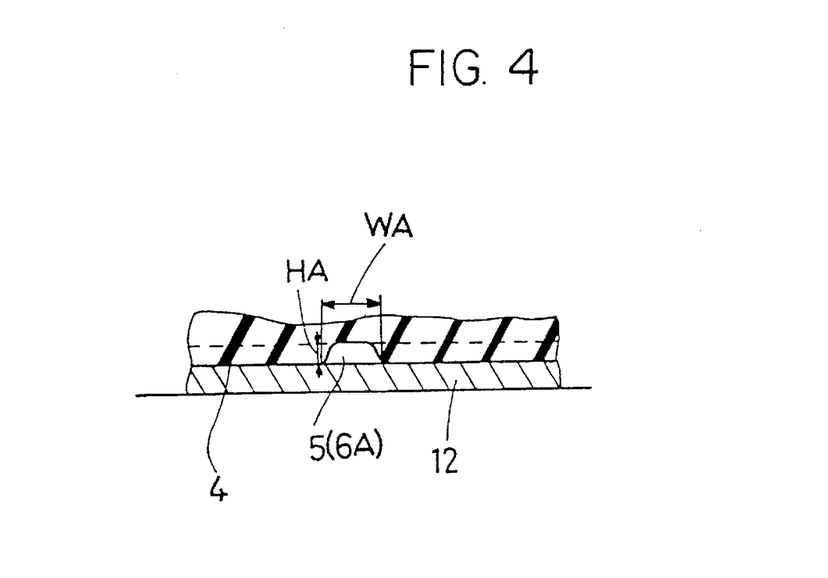
FIG. 4 is a tire circumferential sectional view showing a bead outside surface and rim flange in rim assembly.

On the bead outside surface 4, at least two grooves 6A, or preferably at least eight grooves 6A at equal intervals in the tire circumferential direction are provided. Also, the width WA of the grooves 6A in the tire circumferential direction is set at 0.3 to 5.0 mm, or preferably in a range of 0.5 to 1.0 mm, and the depth HA of the grooves 6A in the axial direction is set at 0.5 to 2.0 mm, or preferably in a range of 0.7 to 1.0 mm.

The action of forcing the air from the gap (g) between the bead part 2 and rim flange 11 formed by the grooves 6A will now be described. Depending on the range of the region S of location of the inner end D of the grooves 6A, the action differs slightly, and individual cases are explained below.

Figure 5:
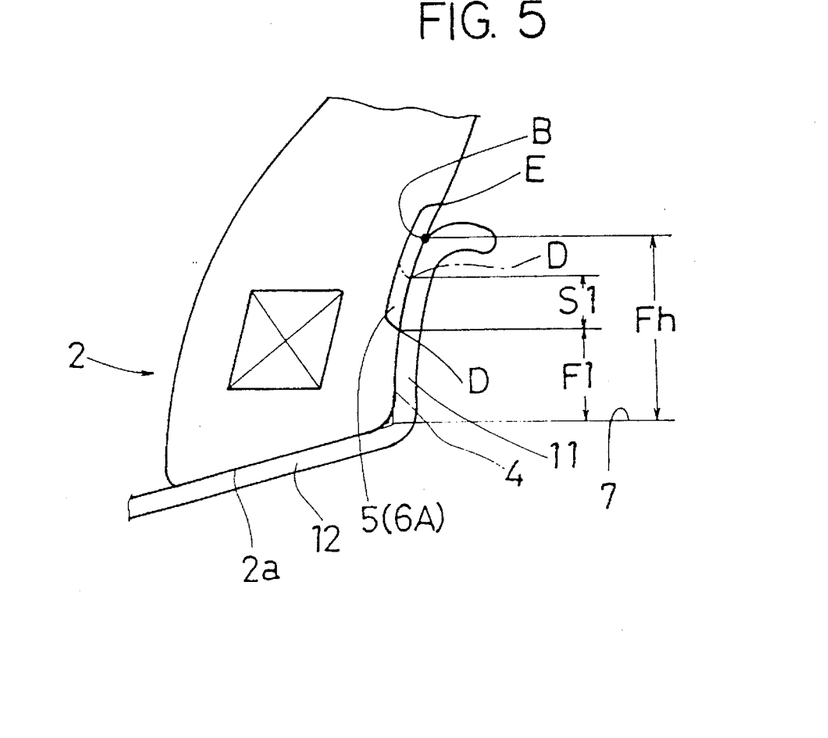
FIG. 5 is a sectional view showing an action after rim assembly.

(1) FIG. 5 shows the case when the inner end D of the grooves 6A are remote from the bead base line 7 by a distance F1 of 0.5 to 0.8 times the separating point height Fh, and the outer end E is located near the separating point B.

Figure 6:
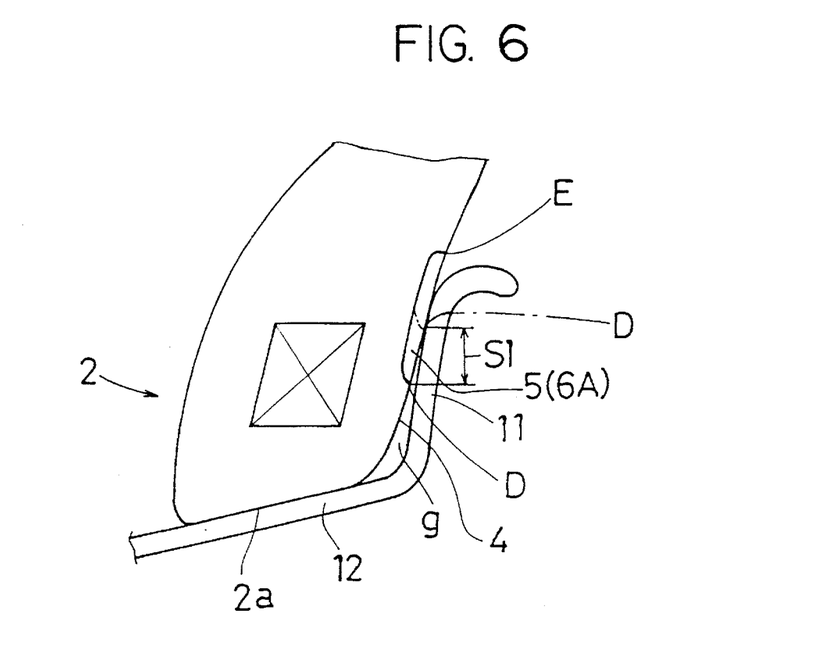
FIG. 6 is a sectional view showing an intermediate action during rim assembly.

This composition is applied to the tire wherein the rigidity of the bead part 2 is high, and the bead part 2 is inclined moderately as shown in FIG. 6, that is, the bead outside surface 4 is assembled in the rim 10 in a state nearly parallel to the rim flange 11. The air in the gap (g) is forced out through the grooves 6A even if the inclination of the bead part is moderate when assembling into the rim as shown in FIG. 6, because the outer end E of the groove 6A is located near the separating point D, and the grooves 6A function as the exhaust means 5 for forming the air passage for allowing to escape of air in the gap.

Figure 7:
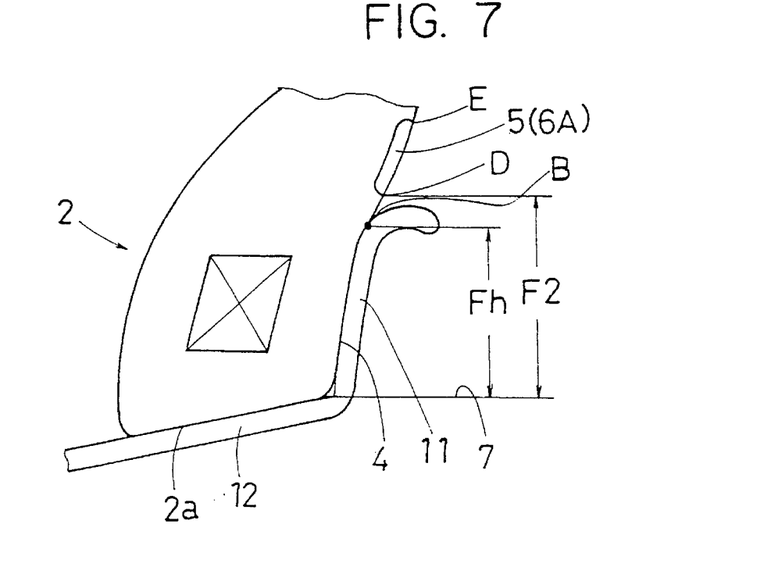
FIG. 7 is a sectional view showing an action after rim assembly in another mode.

(2) FIG. 7 shows the case when the inner end D of the grooves 6A is remote from the bead base line 7 by a distance F2 of 0.8 times to 1.5 times the separating point height Fh. The outer end E is positioned apart from the inner end D by 5 to 15 mm in the radial direction.

This composition is applied to the tire wherein the bending rigidity of the bead part 2 is somewhat soft, and the bead part 2 is greatly inclined relative to the radial direction of the tire as shown in FIG. 8 in rim assembly. The bead outside surface 4 is inserted into the normal rim 10 at a large inclination to the rim flange 11. Therefore, even if the inner end D is higher than the separating point B, the air in the gap (g) is forced out through the grooves 6A as shown in FIG. 8, and the grooves 6A serve as the exhaust means 5 for forming the air passage for allowing escape of the air in the gap (g).

As mentioned above, even though the position of the inner end D is set higher than 1.0 times the separating point height Fh, the inner end D of the groove 6A may be always positioned inward in the radial direction by inserting the bead part 2 into the normal rim 10 with a large inclination. As a result, the air passage for allowing escape of the air in the gap (g) is temporarily formed at the time of rim assembly. Then, upon completion of rim assembly, the grooves 6A are not present between the confronting surfaces of the bead outside surface 4 and rim flange 11, and a rim assembly of high precision is realized.

If the groove width WA of the grooves 6A is less than 0.3 mm or the groove depth HA is less than 0.5 mm, the rubber of the bead part 2 is compressively deformed by contact of the bead outside surface 4 and rim flange 11 at the time of rim assembly, and the air passage may be closed. On the other hand, if the groove width WA is over 5.0 mm or the groove depth HA is over 2.0 mm, the strength of the bead part 2 drops, and the seal effect may be spoiled. If the groove depth HA is less than 1.0 mm, when the accurate rim assembly is over by inserting the bead part 2 into the normal rim 10, the air passage formed by the grooves 6A is closed by elastic deformation by the pressure of the bead part 2. As a result, an air leak in the tire inner space is prevented, and the air tightness is further enhanced.

In the embodiment, furthermore, bypass grooves 9 each extending in the tire circumferential direction can be provided. These bypass grooves 9 are inside the radial direction of the separating point B and they communicate the adjacent grooves 6A. The bypass grooves 9 are provided on the bead outside surface 4 as shown in FIG. 3. The air may be uniformly forced out from the grooves 6A during rim assembly, and the rim assembly precision may be uniform. In the embodiment, the bypass grooves 9 alternately change their positions relative to the bead base line 7. The sectional shape of the grooves 6A may be set in various profiles, including trapezoid, square, partially cut circle, and others.

FIGS. 9 to 13 refer to other embodiment forming the exhaust means 5 by protrusions 6B. In this embodiment, protrusions 6B as the exhaust means 5 extend outward in the radial direction from an inner end D positioned within a region S.

Figure 11:
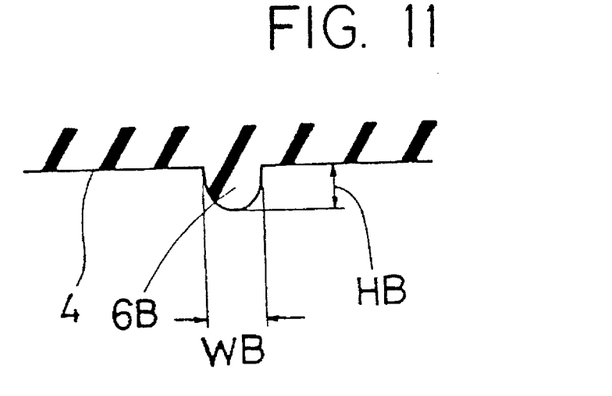
FIG. 11 is a tire circumferential sectional view of protrusions.

On the bead outside surface 4, the protrusions 6B are formed at least by two lines, or preferably by eight lines or more, at intervals in the tire circumferential direction. The width WB of the protrusions 6B in the tire circumferential direction is set at 0.3 to 5.0 mm or preferably in a range of 0.5 to 1.0 mm, and the height HB of the protrusions 6B in the tire axial direction is set at 0.3 to 2.0 mm or preferably in a range of 0.5 to 1.0 mm.

Figure 12:
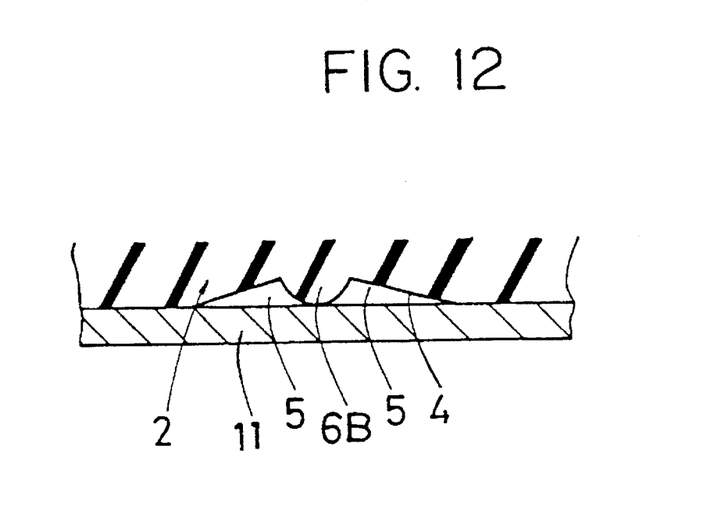

By setting such protrusions 6B, in rim assembly, the top of the protrusions 6B abuts against the rim flange 11 before the bead outside surface 4 contacts with the inward surface of the rim flange 11. As a result, an air passage for releasing the air between the bead part 2 and rim flange 11 is formed at both sides of each protrusion 6B.

By setting the height HB of the protrusions 6B at 1.0 mm or less, when assembled correctly in the rim, the air passage is closed due to the same reason as when the groove depth HA is set at 1.0 mm. leakage of air in the tire inner space may be more securely prevented.

Figure 13:
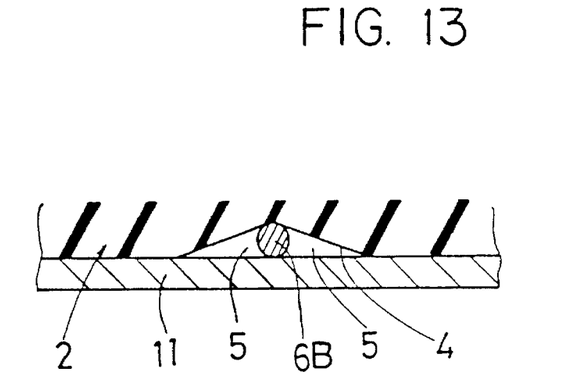
FIG. 13 is a circumferential sectional view of a tire bead part showing other example of protrusions.

Meanwhile, the protrusions 6B may be formed in one body with the bead rubber forming the bead outside surface 4 as shown in FIG. 12. Alternatively the protrusions 6B may be formed separately from the bead rubber as shown in FIG. 13, and the separate protrusions 6B may be placed between the bead outside surface 4 and rim flange 11 when assembling the bead part 2 into the normal rim, thereby forming the exhaust means 5.

Examples

In the tire size of 205/65R15, the tires (Embodiments 1, 2) in the composition shown in FIGS. 1, 2 were assembled in a normal rim of 6.55JJ×15, and inflated at internal pressure of 2.0 kg/cm$^2$, and the maximum size of the gap (g) in rim assembly was measured. A conventional tire (Reference) without air vent grooves as shown in FIG. 15 was similarly assembled in a rim, and the gap (g) was measured. The gap size was measured by using a CT scanner. The measurement of the gap is expressed by the mean of measuring four points each on the front and rear side.

To measure the rim deviation, the test tires were installed in a car, and by traveling at a speed of 80 km/h, the brake test of applying brakes of 0.8 G by the gravitational accelerometer for measuring the acceleration in the running direction was repeated 20 times. The total of the rim deviation of tire and rim was measured.

To analyze vibration, the car mounting test tires was driven 100 km, and presence or absence of vibrations was judged by the feeling of the driver.

The results of measurement are shown in Table 1.

As a result of test, as shown in Table 1, in the embodiments, as compared with the reference example, the gap in rim assembly was slight, and the rim deviation was small, and formation of vibrations after specific use was suppressed.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

TABLE 1

|  | Embodiment 1 | Embodiment 2 | Reference |
| --- | --- | --- | --- |
| Composition of exhaust means | Grooves (FIG. 1) | Protrustions (FIG. 9) | None |
| Height of inner end of exhaust means from bead base line (ratio to separating point height Fh) | 0.85 Fh | 0.85 Fh | — |
| Gap after rim assembly | 0.04 mm | 0 mm | 1.2–1.3 mm |
| Rim deviation | 2.0 mm | 0 mm | 30 mm |
| Vibration | No abnormality after 100 km travel | No abnormality after 100 km travel | No abnormality after 100 km travel |

What is claimed is:

1. A tire and rim combination, the tire being mounted on the rim and the rim being a normal rim, the tire comprising a pair of bead parts each having a bead bottom surface seating on a rim seat of the normal rim, a bead outside surface connecting with the bead bottom surface and abutting against a rim flange of the normal rim, and a bead inside surface opposite to the bead outside surface and adjacent the bead bottom surface, the rim seat extending to a rim protrusion on an axially inner side thereof, said bead outside surface in each bead part having exhaust means extending outwardly in a radial direction from an inner end of the exhaust means so as to form at least one air passage for escape of air between the rim flange and the bead outside surface during rim assembly, the bead outside surface contacting air-tightly with the rim flange from a bead heel to the inner end of the exhaust means, said inner end of the exhaust means in each bead part being positioned within a region remote from a bead base line by a distance of 0.5 to 1.5 times a separating point height Fh defined as a height in the radial direction from a bead base line to a separating point at which the bead outside surface separates from the rim flange, and the tire between the bead inside surface and the bead bottom surface in each bead part being spaced from and out of engagement with the rim protrusion.

2. The tire and rim combination of claim 1, wherein the exhaust means in each bead part comprises a plurality of grooves formed in the bead outside surface.

3. The tire and rim combination of claim 1, wherein the exhaust means in each bead part comprises a plurality of protrusions projecting from the bead outside surface.

4. The tire and rim combination of claim 1, 2 or 3, wherein the exhaust means in each bead part comprises grooves or protrusions extending outwardly in the radial direction from the inner end of the exhaust means remote from the bead base line by a distance of 0.5 to 0.8 times the separating point height Fh, and a radially outer end of the exhaust means in each bead part is disposed near the separating point.

5. The tire and rim combination of claim 1, 2 or 3, wherein the exhaust means in each bear part comprises grooves or protrusions extending outwardly in the radial direction from the inner end of the exhaust means remote from the bead base line by a distance of 0.8 to 1.5 times the separating point height Fh, and a radially outer end of the exhaust means in each bead part is spaced from the inner end of the exhaust means by a distance of 5 to 15 mm in the radial direction.

6. The tire and rim combination of claim 1, 2 or 3, wherein the exhaust means in each bead part comprises grooves or protrusions extending outwardly in the radial direction from the inner end of the exhaust means remote from the bead base line by a distance of 1.0 to 1.5 times the separating point height Fh, and a radially outer end of the exhaust means in each bead part is spaced from the inner end of the exhaust means by a distance of 5 to 15 mm in the radial direction.

7. The tire and rim combination of claim 1, 2 or 3, wherein the exhaust means in each bead part comprises at least two grooves or protrusions disposed at intervals in a tire circumferential direction.

8. The tire and rim combination of claim 1, 2 or 3, wherein the exhaust means in each bead part comprises at least eight grooves or protrusions disposed at intervals in a tire circumferential direction.

9. The tire and rim combination of claim 1, 2 or 3, wherein the exhaust means in each bead part comprises grooves or protrusions having a width in a tire circumferential direction of 0.3 to 5.0 mm.

10. The tire and rim combination of claim 1, 2 or 3, wherein the exhaust means in each bead part comprises grooves or protrusions having a width in a tire circumferential direction of 0.5 to 1.0 mm.

11. The tire and rim combination of claim 1, 2 or 3, wherein the exhaust means in each bead part comprises grooves or protrusions having a depth or height in the tire axial direction of 0.5 to 2.0 mm.

12. The tire and rim combination of claim 1, 2 or 3, wherein the exhaust means in each bead part comprises grooves or protrusions having a depth or height in the tire axial direction of 0.7 to 1.0 mm.

13. The tire and rim combination of claim 1, further comprising bypass grooves extending in a circumferential direction, the bypass grooves being provided inside the separating point in each bead part in the radial direction, the bypass grooves being in communication with the exhaust means.

14. The tire and rim combination of claim 13, wherein the adjacent bypass grooves in the circumferential direction are different distances from the bead base line in each bead part.

15. The tire and rim combination of claim 2, further comprising bypass grooves extending between the grooves of the exhaust means in each bead part, the bypass grooves extending in a circumferential direction and being in communication with the grooves of the exhaust means.

16. The tire and rim combination of claim 15, wherein adjacent bypass grooves are different distances from the bead base line in each bead part.

17. The tire and rim combination of claim 15, wherein the bypass grooves are provided inside of the separating point in the radial direction.

18. The tire and rim combination of claim 3, further comprising bypass grooves extending between the protrusions of the exhaust means in each bead part, the bypass grooves extending in a circumferential direction and being in communication with the protrusions of the exhaust means.

19. The tire and rim combination of claim 18, wherein adjacent bypass grooves are different distances from the bead base line in each bead part.

20. The tire and rim combination of claim 18, wherein the bypass grooves are provided inside of the separating point in the radial direction.

* * * * *

UNITED STATES PATENT AND TRADEMARK OFFICE
CERTIFICATE OF CORRECTION

PATENT NO. : 5,573,612

DATED : November 12, 1996

INVENTOR(S) : Tagashira et al.

It is certified that error appears in the above-indentified patent and that said Letters Patent is hereby corrected as shown below:

In the drawings, delete reference "D" from Figures 2, 5, 6 and 10.

The sheets of the Patent having Figures 2, 5, 6 and 10 should be replaced with the attached three (3) sheets.

Signed and Sealed this

Tenth Day of February, 1998

Attest:

BRUCE LEHMAN

Attesting Officer

Commissioner of Patents and Trademarks